US012284606B2

(12) United States Patent
Sabouri-Sichani et al.

(10) Patent No.: US 12,284,606 B2
(45) Date of Patent: Apr. 22, 2025

(54) MULTI-USIM UE ASSISTANCE INFORMATION WITH UNAVAILABLE TIME

(71) Applicant: Nokia Technologies Oy, Espoo (FI)

(72) Inventors: Faranaz Sabouri-Sichani, Aalborg (DK); Frank Frederiksen, Klarup (DK); Thomas Haaning Jacobsen, Norresundby (DK); Nuno Manuel Kiilerich Pratas, Gistrup (DK)

(73) Assignee: Nokia Technologies Oy, Espoo (FI)

( * ) Notice: Subject to any disclaimer, the term of this patent is extended or adjusted under 35 U.S.C. 154(b) by 407 days.

(21) Appl. No.: 17/781,546

(22) PCT Filed: Nov. 18, 2020

(86) PCT No.: PCT/FI2020/050771
§ 371 (c)(1),
(2) Date: Jun. 1, 2022

(87) PCT Pub. No.: WO2021/111031
PCT Pub. Date: Jun. 10, 2021

(65) Prior Publication Data
US 2023/0042849 A1 Feb. 9, 2023

Related U.S. Application Data

(60) Provisional application No. 62/942,461, filed on Dec. 2, 2019.

(51) Int. Cl.
*H04W 48/20* (2009.01)
*H04W 48/18* (2009.01)
(Continued)

(52) U.S. Cl.
CPC .......... *H04W 48/20* (2013.01); *H04W 48/18* (2013.01); *H04W 68/005* (2013.01); *H04W 72/1263* (2013.01)

(58) Field of Classification Search
CPC ... H04W 48/20; H04W 48/18; H04W 68/005; H04W 72/1263; H04W 8/183; H04W 72/1215; H04W 4/60; H04W 76/15
See application file for complete search history.

(56) References Cited

U.S. PATENT DOCUMENTS

| 8,725,212 B2 | 5/2014 | Pattaswamy et al. ........ 455/558 |
| 2012/0052911 A1 | 3/2012 | Chin et al. .................... 455/558 |

(Continued)

FOREIGN PATENT DOCUMENTS

| CN | 103167475 A | 6/2013 |
| CN | 108370520 A | 8/2018 |
| WO | WO 2018/153487 A1 | 8/2018 |

OTHER PUBLICATIONS

3GPP TSG-RAN WG2 Meeting #105, Athens, Greece, Feb. 25-Mar. 1, 2019, R2-1901885, "UE assisted RRC state transition", Apple, 3 pgs.

(Continued)

*Primary Examiner* — Steven Hieu D Nguyen
(74) *Attorney, Agent, or Firm* — McCarter & English LLP

(57) ABSTRACT

Method, apparatus, computer program for a user equipment having at least two connections to at least two network nodes, where each connection corresponds to a different user identity, selecting by the user equipment one of the at least two network nodes to communicate exclusively with during one or more time intervals; and sending by the user equipment one or more messages toward the other ones of the at least two network nodes, the one or more messages indicating to the other ones of the at least two network nodes that the user equipment is unavailable for communication during the one or more time intervals.

18 Claims, 5 Drawing Sheets

(51) Int. Cl.
  *H04W 68/00*    (2009.01)
  *H04W 72/1263*  (2023.01)

(56) References Cited

U.S. PATENT DOCUMENTS

| | | | |
|---|---|---|---|
| 2012/0058748 A1* | 3/2012 | Jeung | H04W 88/06 |
| | | | 455/414.1 |
| 2012/0172011 A1* | 7/2012 | Gupta | H04W 68/02 |
| | | | 455/414.1 |
| 2012/0190362 A1 | 7/2012 | Subbarayudu et al. | 455/435.1 |
| 2013/0250854 A1 | 9/2013 | Davis et al. | 370/328 |
| 2013/0267267 A1 | 10/2013 | Mujtaba et al. | 455/509 |
| 2014/0120925 A1 | 5/2014 | Kanthala | 455/450 |
| 2014/0228039 A1* | 8/2014 | Zhao | H04B 1/3816 |
| | | | 455/458 |
| 2015/0023258 A1* | 1/2015 | Hu | H04W 76/15 |
| | | | 370/328 |
| 2015/0065132 A1* | 3/2015 | Ramkumar | H04W 48/16 |
| | | | 455/435.2 |
| 2017/0265114 A1 | 9/2017 | Sahu et al. | 36/14 |
| 2018/0160422 A1* | 6/2018 | Pathak | H04W 76/10 |
| 2021/0014934 A1* | 1/2021 | Lovlekar | H04W 8/183 |
| 2022/0053448 A1* | 2/2022 | Velev | H04W 8/183 |
| 2022/0272761 A1* | 8/2022 | Park | H04W 74/0833 |

OTHER PUBLICATIONS

3GPP TSG RAN Meeting #83, Shenzhen, China, Mar. 18-21, 2019, RP-190248, "Motivation for SI on multi-SIM devices in RAN", China Telecom, vivo, 3 pgs.

* cited by examiner

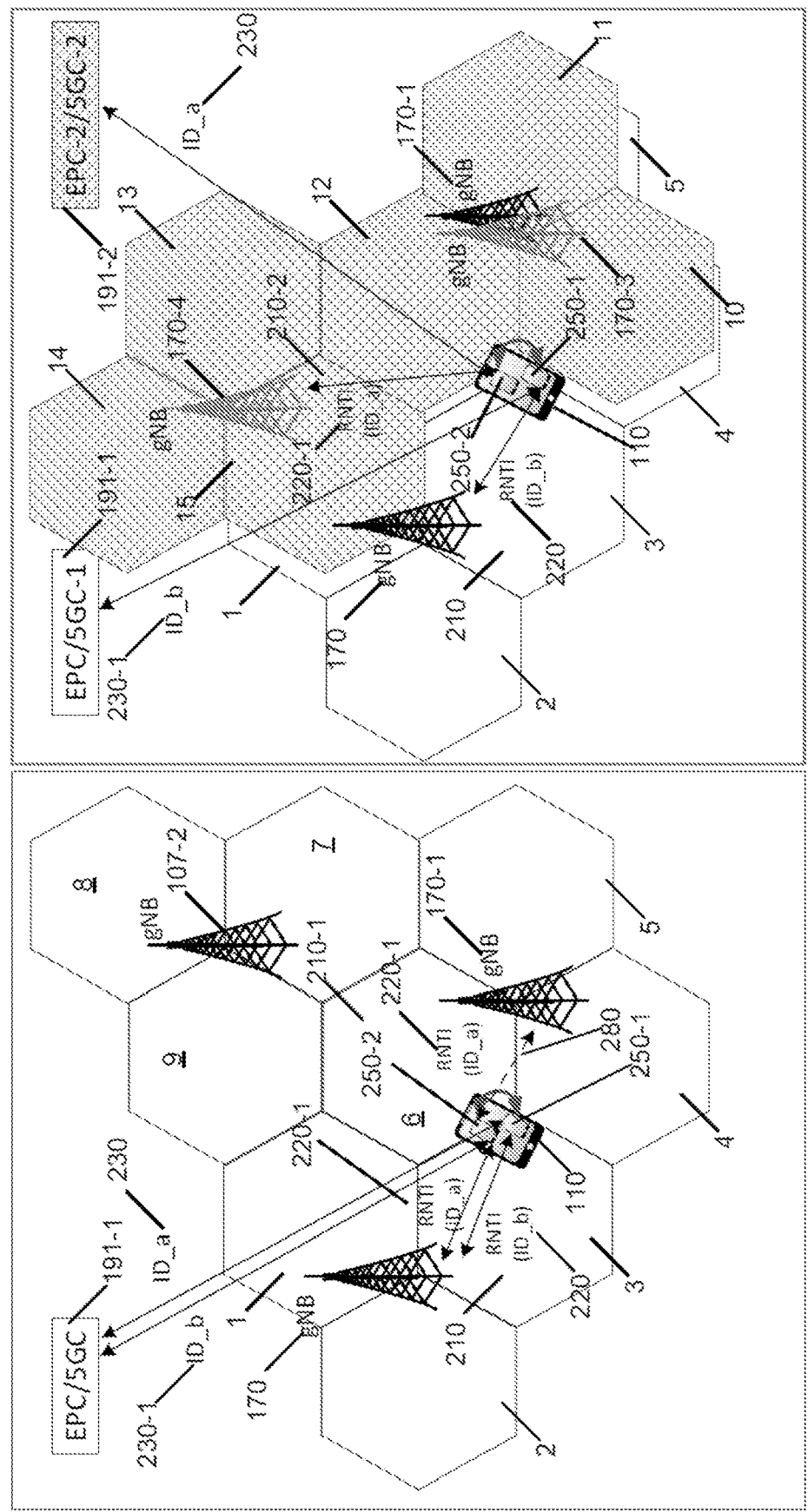
FIG. 2(a) MUSIM UE with USIMs belonging to same MNO
FIG. 2(b) MUSIM UE with USIMs belonging to different MNOs

Signaling procedure

| | Signaling procedure |
|---|---|
| 1 | Voice call (both CS call as well as VoLTE, VoNR, and VoIP) |
| 2 | Paging reception |
| 3 | RSSI scan and SIB read |
| 4 | Data connection |
| 5 | RRM measurements |

FIG. 3

Upon initiating the procedure, the UE shall:
1> if configured to provide UE availability report:

2> if the UE did not transmit a *UEAssistanceInformation* message with *availabilityReport* since it was configured to provide UE availability report; or 2> if the current availability report is different from the one indicated in the last transmission of the *UEAssistanceInformation* message 3> initiate transmission of the *UEAssistanceInformation* message in with its availability report;

FIG. 5

MULTI-USIM UE ASSISTANCE INFORMATION WITH UNAVAILABLE TIME

CROSS REFERENCE TO RELATED APPLICATION

This patent application is a U.S. National Stage application of International Patent Application Number PCT/FI2020/050771 filed Nov. 18, 2020, which is hereby incorporated by reference in its entirety, and claims priority to U.S. provisional application 62/942,461 filed Dec. 2, 2019, which is hereby incorporated by reference in its entirety.

TECHNICAL FIELD

This invention relates generally to wireless networks and, more specifically, relates to wireless devices, referred to as user equipment, that access the networks using multiple Universal Subscriber Identity Module (USIM) cards.

BACKGROUND

A Subscriber Identity Module (SIM) is a memory chip used in mobile phones. The SIM has largely been supplanted by Universal Subscriber Identity Module (USIM) cards, which provide enhanced features relative to SIM cards, such as enhanced security and the like. USIMs are basically tiny "computers" that provide many different features.

Recently, there is some movement toward user equipment (UEs) having multiple USIMs (or multi-USIMs). These devices are referred to as MUSIM devices. While additional or multiple services can be provided by such MUSIM devices, the coordination and use of two different services and activities can be problematic across different network operators in such devices.

BRIEF DESCRIPTION OF THE DRAWINGS

In the attached Drawing Figures:

FIG. 2(a) is an illustration of a cellular network with a MUSIM UE with USIMs belonging to the same MNO;

FIG. 2(b) is an illustration of a cellular network with a MUSIM UE with USIMs belonging to the different MNOs;

FIG. 3 is an example of a table (Table 1) of priority across different signaling procedures;

FIG. 5 illustrates an exemplary proposal to extend a UEAssistanceInformation message by adding the possibility for the UE to inform its unavailability time, in an exemplary embodiment;

DETAILED DESCRIPTION OF THE DRAWINGS

Figure 1:
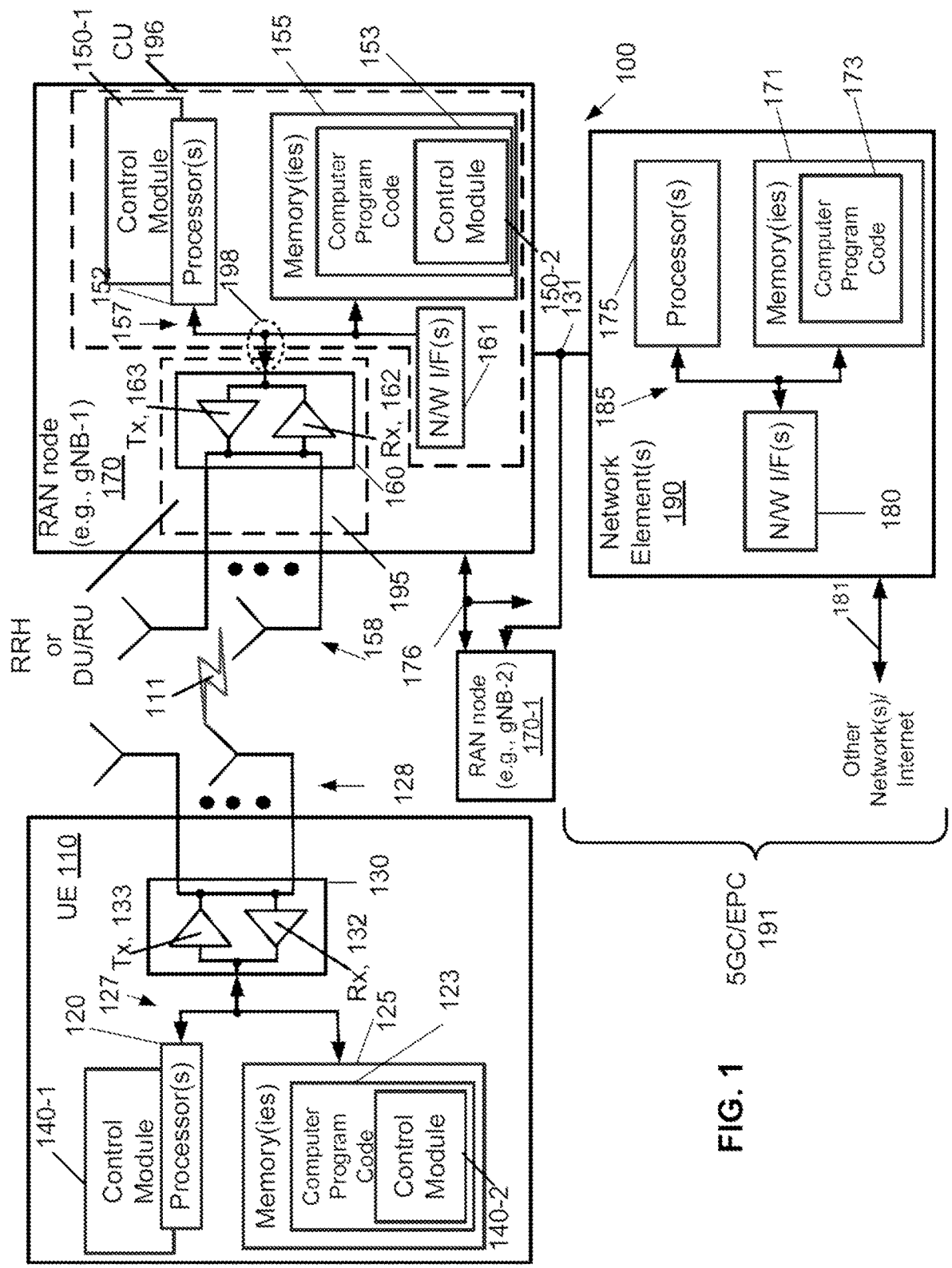
FIG. 1 is a block diagram of one possible and non-limiting exemplary system in which the exemplary embodiments may be practiced.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for multi-USIM (MUSIM) UE assistance information with its unavailable time. Additional description of these techniques is presented after a system into which the exemplary embodiments may be used is described.

Turning to FIG. 1, this figure shows a block diagram of one possible and non-limiting exemplary system in which the exemplary embodiments may be practiced. A user equipment (UE) 110, radio access network (RAN) nodes 170 and 170-1, and network element(s) 190 are illustrated. In FIG. 1, a user equipment (UE) 110 is in wireless communication with a wireless (e.g., cellular) network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN nodes 170, 170-1 are base stations that provide access by wireless devices such as the UE 110 to the wireless network 100. The RAN node 170 is also referred to as gNB-1 herein, and the RAN node 170-1 is also referred to as gNB-2 herein. The RAN node 170-1 is assumed to be similar to RAN node 170, and therefore only the possible internal configuration of RAN node 170 is described herein.

The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170, 170-1 (or additional) communicate using, e.g., link(s) 176. The link(s) 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that the base station that forms the cell will perform the functions. The cell makes up part of a base station. That is, there can be multiple cells per base station. For instance, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The core networks 191 of 5GC or EPC are shown, comprising the network element(s) 190. The RAN nodes 170, 170-1 are coupled via a link or links 131 to a network element 190. The link(s) 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments of this invention, the exemplary embodiments will now be described with greater specificity.

It is noted that the exemplary embodiments are presented herein in the context of 5g. It should be understood, however, the exemplary embodiments may cover NR, EUTRA and NR-EUTRA dual connectivity cases. For instance, the RAN node 170 could be an eNB as legacy EUTRA, with both control and user plane towards the UE 110 and connected to an EPC 191. Other options are possible too.

The exemplary embodiments herein are in the context of support for multi-USIM devices, mainly in 5G NR and LTE. There has been an ongoing Rel-17 study item on Service and System Aspects (SA) (see SP-190248, "Study on system enablers for multi-USIM devices (FS_MUSIM)", 3GPP Work Item Description approved in TSG SA meeting #SP-83, March 2019, and the corresponding technical report 3GPP TR 23.761 V0.1.0 (2019 October)), and Radio Access Network (RAN) (see RP-190282 "Study on multi-SIM devices in RAN", 3GPP Work Item Description presented as information in TSG RAN meeting #SP-83, March 2019, and the corresponding 3GPP Technical Report TR 22.834 V17.1.0 (2019 September)).

The main objectives proposed in the SA study and the work for the upcoming Rel-17 work item are given below (see SP-190248, "Study on system enablers for multi-USIM devices (FS_MUSIM)", 3GPP Work Item Description approved in TSG SA meeting #SP-83, March 2019):

---

This study item shall address the following system enablers for multi-USIM devices:
A mechanism for delivering paging destined to USIM A while the UE is actively communicating with USIM B.
A mechanism allowing for suspension (or release) and resumption of an ongoing connection in the 3GPP system associated with USIM A, so that the UE can temporarily leave to the 3GPP system associated with USIM B, and then return to the 3GPP system in a network-controlled manner.
The study shall determine how the network handles MT data or MT control-plane activity occurrence on a suspended connection.
A mechanism for avoidance of paging collisions occurring in the UE between USIM A and USIM B.
Handling of emergency calls and sessions.
Handling of service prioritization i.e. the study shall determine whether the UE behaviour upon reception of paging information is driven by USIM configuration or user preferences or both.

---

NOTE 1:
This objective is expected to be further aligned through Stage 1 requirements. Additional objectives may be added if there are further Stage 1 requirements.
NOTE 2:
The enablers for Dual-USIM are expected to also apply to multi-USIM scenarios. The study shall be restricted to single Rx/single Tx and dual Rx/single Tx UE implementations.
NOTE 3:
The focus of the study is on enablers for multi-USIM implementations relying on common radio and baseband components that are shared among the multiple USIMs.

Of particular importance is the following statement from the above material: "The study shall determine how the network handles MT data or MT control-plane activity occurrence on a suspended connection." That is, MT (Mobile-Terminated) data or corresponding control-plane activity will be studied and the effects with MT data are not yet known.

The main objectives of the RAN study item or core part of the work item including the test part are given below (see RP-190282, "New Rel-17 SID proposal: Study on multi-SIM devices in RAN", 3GPP Work Item Description presented as information in TSG RAN meeting #SP-83, March 2019):

---

This study item study and identify system enablers for the following scenarios for multi-USIM devices:
Mechanisms for receiving paging or measurement for USIM A while the UE is actively communicating with USIM B in single connection or DC configuration.
Mechanisms allowing for suspension (or release) and resumption of an ongoing connection in the 3GPP system associated with USIM A, so that the UE can temporarily access the 3GPP system associated with USIM B.
Mechanisms for avoidance of paging collisions occurring in the UE between USIM A and USIM B.
Power control and UE capability coordination for voice service in USIM A and data service in USIM B.
Cell selection/reselection enhancements
Different UE architectures, including single Rx/single Tx, dual Rx/single Tx UE and dual Rx/dual Tx implementation should be considered in the study. Both Inter-MNO and intra-MNO scenarios should be considered in the study.

---

As this example and the previous example regarding MT data illustrate, a lot of technical details with respect to operation using MUSIM devices are not known or are being examined.

Concerning background on multi-USIM (MUSIM) devices and existing solutions, a multi-USIM device (such as a UE 110) has two (Dual) or more (Multiple) simultaneous 3GPP/3GPP2 network subscriptions with multiple corresponding International Mobile Subscriber Identities (IMSIs), each associated with a particular USIM belonging to the same or different Mobile Network Operator (MNO (/Mobile Network Virtual Operator (MNVO)). A MUSIM device connected to one or more gNBs 170, 170-1 (or additional gNBs) with independent subscriptions is shown in FIGS. 2(*a*) and 2(*b*). In FIG. 2(*a*) the two USIMs 250-1, 250-2 in UE 110 belong to the same MNO/MVNO, registered with two independent IDs (ID_a 230 and ID_b 230-1) at the core network EPC/5GC 191-1, and may be using the same cell 210 (formed by gNB 170) or two neighbor cells 210, 210-1 (formed by gNBs 170, 170-1, respectively) as the serving cells. For instance, the very same serving cell can be used by the two (or more) USIMs in a device. Seen from the gNB (and CN) perspective, this device is seen as two independent UEs. The dashed line 280 shows that even though the two USIMs 250, 250-1 belong to same MNO, the UE may use two neighboring serving cells (e.g., if the UE is at the edge of two). The RNTI 220 from the gNB 170 has an indication of the ID_b 230-1 and the RNTI 220-1 from the gNB 170-1 has an indication of the ID_a 230. In FIG. 2(*a*), cells 1 through 9 are shown, where cells 1, 2 and 3 are formed by the gNB 170, cells 4, 5, and 6 are formed by gNB 170-1, and cells 7, 8, and 9 are formed by gNB 170-2.

In FIG. 2(*b*), the two USIMs 250-1, 250-2 in UE 110 belong to different MNOs, indicated by two different core networks EPC/5GC-1 191-1 and EPC/5GC-1 191-2, and may be using two neighboring or co-located cells 220 from each MNO as a serving cell. In this case, the cells are neighboring cells 210, 210-2. The RNTI 220-1 with ID_a come from the gNB 170-4, while the RNTI 220 with ID_b comes from gNB 170. The cells 1-9 correspond to EPC/5GC-1 191-1, and cells 10-15 correspond to EPC/5GC-1 191-2. The cells 10-15 are shown "overlapping" the cells 1 and 4-9. For instance, cell 15 overlaps cell 1; cell 10 overlaps cell 4; and cell 11 overlaps cell 5. The other cells for EPC/5GC-1 191-1 are hidden. The gNB 170-3 forms cells 10, 11, and 12, and the cell 170-4 forms cells 13, 14, and 15. Here, the UE is using two completely different serving cells (from different PLMN/MNOs) but also here, the two cells (from different PLMN/MNOs) can be potentially co-located or neighbors. For instance, the UE could be connected to gNBs 170-1 and 170-3 which might be collocated as shown in FIG. 2(*b*) (e.g., in the same tower).

MUSIM devices are widely available in the market—especially in the enhanced Mobile Broad Band (eMBB) section of the market. However, there is no 3GPP standard support tailored for MUSIM usage, hence, no specified way for coordination across 2 PLMNs, nor is there a possibility to perform performance/conformance tests of a device in 3GPP-defined MUSIM use cases. The current existing products utilize UE proprietary implementation without any possibility to control the behavior from the NW (network).

A single USIM UE device 110 compliant to carrier aggregation (CA) and Dual Connectivity (DC) (which was introduced in 3GPP Release 10 and enhanced with increased number of carriers in consecutive releases) or diversity/MIMO requirements has already several RX and TX chains, typically 5-8 RX and 3-4 TX for support of Release 15. However, the user equipment is not capable of supporting 5-8 parallel independent RX or 3-4 parallel independent TX due to one or several of the reasons given below or other HW limitations.
 1) Depending on the RF HW (hardware) design, not all RX and TX chains cover the full range of frequencies (also denoted as band-groups)—i.e. Low Band (LB), Mid Band (MB), High Band (HB), Ultra High Band (UHB), and millimeter-wave (mmW)—used in cellular communication and support of MIMO.
 2) Depending on the RF HW design, front-end components are shared for carriers in the band-group.
 3) Intermodulation products across several RX frequencies and TX frequencies as well as the local oscillator generate continuous waveform (CW) as well as modulated spurious signals which act as interference for the received signals. In-device self-interference cancellation is applied to cancel generated CW and modulated spurs. However, this cancelation needs dynamic time-accurate synchronized knowledge on RX and TX LOs (local oscillators).

Due to increasingly challenging requirements on device size and weight as well as battery lifetime, the eMBB MUSIM devices will utilize the same single USIM HW for multi-USIM operation by sharing the continuously increased number of RX and TX chains across the two USIM.

With respect to multi-USIM terminology, two main types of MUSIM devices are normally referred to depending on the supported simultaneous RRC states on the USIMs:
 1) Dual SIM Dual Standby (DSDS) or Multi USIM Multi Standby (MUMS). These are MUSIM devices which are registered with two or more independent subscriber IDs (USIMs) and can be in RRC_IDLE mode on all USIMs. However, this device can only be on RRC_CONNECTED mode with a single USIM at a given time.
 2) Dual SIM Dual Active or Multi USIM Multi Active (MUMA). These are MUSIM devices which are registered with two or more independent subscriber IDs (USIMs) and can be in RRC_IDLE mode on all USIMs. Furthermore, the device can maintain RRC_CONNECTED mode activities on all USIMs.

Additionally, the UE's behavior with respect to the simultaneous handling of multiple USIMs may depend on the UE's HW and SW capabilities as listed below:
 a) SingleRx/SingleTx: The UE is only capable of receiving traffic from one network and and/or transmitting traffic to one network at a time;
 b) DualRx/SingleTx: The UE is capable of simultaneously receiving traffic from two networks but is capable of transmitting to only one network at a time; or
 c) DualRx/DualTx: The UE is capable of simultaneously receiving traffic from two networks and/or simultaneously transmitting traffic to two networks.

A technical issue that exists is that a SingleRx/SingleTx or DualRx/DualTx MUSIM device will not be able to avoid interruption in some services from one USIM due to activities related to another USIM. As such, current UE proprietary implementation addresses the MUSIM conflicting use cases using different prioritization schemes and UE-specific time multiplexing of its DL and UL activities across the two USIM without any possibility at the network side to control the behavior. Unless well designed, these devices have the capability to break or bypass existing network services. An example of a priority scheme as a UE implementation is shown in Table 1, illustrated in FIG. 3, which is an example of a table of priority across different signaling procedures. Any procedure with higher priority (lower value) on one USIM can potentially interrupt on-going activity with lower priority (higher values) on other USIM.

One problem of a UE performing autonomous prioritization of its radio activities is that neither of the serving networks will be aware that the UE is down-prioritizing their respective activities and, hence, may spend network resources when scheduling a UE that is not monitoring for traffic from this network. In the extreme case, this can lead to radio link failures to occur in the down-prioritized USIM, which will then result in additional signaling to recover the connection of the USIM to the network.

At present there are no available mechanisms for coordinating actions between networks for MUSIM operation.

To address these issues, in an exemplary embodiment, a signaling mechanism is introduced, where a UE is able to indicate its "availability" towards the serving network. Under current network operation, the UE is assumed to be available for service on a near-constant basis with the exception of configured measurement gaps (where the UE is configured with time periods for performing inter-frequency measurements).

By contrast, an exemplary signaling mechanism in an example herein will allow the UE to indicate in a structured way that the UE will not be monitoring for DL traffic or be available for UL scheduling. In terms of DL, the proposed scheme may comprise PDCCH as well as PDSCH. The signaling mechanism may include a combination of long-term indications and short-term ad-hoc indications. In terms of UL, an exemplary proposed scheme has the UE inform to the gNB which periods the UE is not available to be scheduled for UL transmission.

Specifically, in exemplary embodiments herein the following operations may be performed:
1) Changes in the 3GPP standard may be implemented to allow the UE to inform a gNB about the UE's planned activities in the future as well as short-term dynamic activities, such as:
   a) Change in the existing UL-DCCH-message, UEAssistanceInformation, or introducing a new dedicated message for scheduled and/or periodic activity in the future with known specified length; and/or
   b) UCI messaging carried in PUCCH or PUSCH with information on short-term unavailability at start and end of the unavailable time or at start with length of unavailable time for dynamically scheduled activities.
2) An exemplary embodiment also proposes to define a minimum time drift across the two networks at which the reported unavailable time is valid.

An overview of exemplary proposed solutions is now presented. According to an exemplary embodiment, the NW (network) will receive an indication from the UE about the time instance(s) and/or period(s) where the UE will not be available for either DL or UL scheduling by the serving network. During these time instances, the serving network might as well consider the UE as unavailable for scheduling. It should be noted that it is assumed that the UE has accurate knowledge of the relative timing of the impacted networks (in case of the unavailability being caused by other networks being served at the same time) and can convert the timing needs across the networks.

According to an exemplary embodiment, the indication of a UE's availability would potentially take two forms or types, depending on the UE activity and the time in advance the knowledge about the activity is available, which may be combined. These are denoted "type 1" for the long-term indication (e.g., where the indication accuracy would be at frame level) and "type 2" for dynamic indications of unavailability (e.g., where the indication accuracy would be at slot level or lower) as described in detail below.

Figure 4:
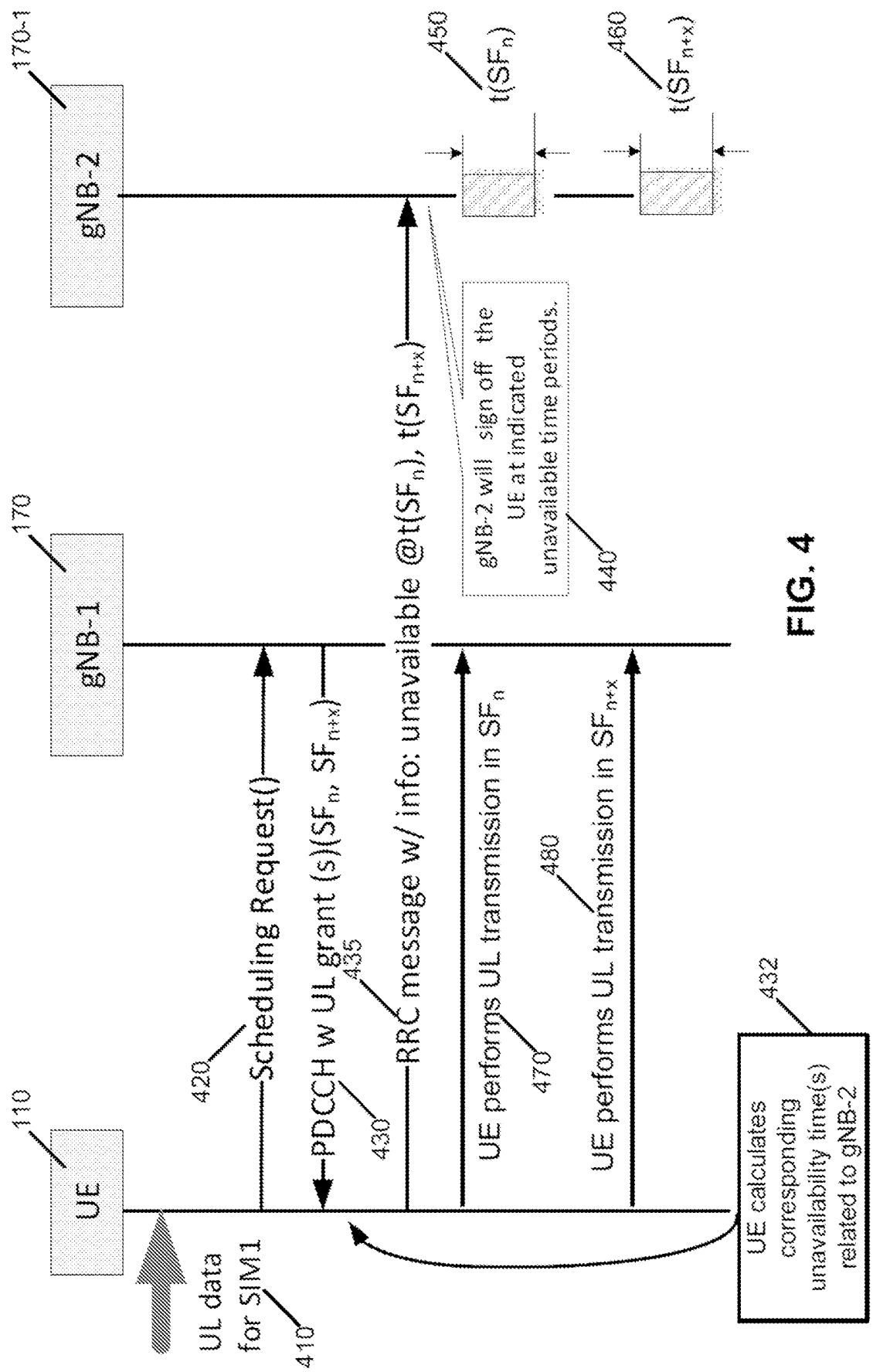
FIG. 4 is a signaling diagram and message sequence chart showing an example of, e.g., RRC messaging from a UE to gNB with one or more unavailable time intervals, in accordance with an exemplary embodiment.

Regarding Type 1, (semi) static, periodic scheduled activities, these are intended for cases where the UE has a scheduled and/or periodic activity in the future with known specified length. An exemplary signaling scheme for this kind of information could be RRC, since the adjustment rate of RRC signaling is slow and the signaling is carried over a reliable control channel. A signaling and message sequence is shown as an example of this case in FIG. 4 and the steps are described below. FIG. 4 illustrates the signaling between the UE 110, e.g., under control of the control module 140, and the gNB-1 170 and gNB-2 170-1, e.g., under control of a corresponding control module 150.

In step 410, a SIM1 in the UE has UL data to be transmitted to gNB-1. In step 420, the UE 110 therefore sends a Scheduling Request( ) message to the gNB-1 170, and receives in step 430 one or several UL grants from the gNB-1 for one or several subframes (SFs) in response to the UE's scheduling request with its buffer status. That is, in this example, the UE performed the Scheduling Request (SR) with an associated Buffer Status Report (BSR), and the UE in response receives respective UL grants. The mechanisms to send a SR and the BSR are dependent on the current UE status, including if the UE has or has not assigned an SR resource. The SR can be sent over a PUCCH resource or as part of a PUSCH payload, where the SR is made part of an Uplink Control Information (UCI). The UL grant uses PDCCH. In this example, the UL grants concern the subframes $SF_n$ and $SF_{n+x}$. While the UL grant could be for successive subframes n trough n+x, this example is pointing to two non-contiguous grants, i.e. one in $SF_n$ and another one in $SF_{n+x}$, as shown in the figure with two rectangles and time intervals 450 and 460.

In step 432, the UE 110 calculates the corresponding unavailability time(s) related to gNB-2. This could be, for instance, the frame and subframe numbers for gNB-2, and these are represented in FIG. 4 by $t(SF_n)$ (corresponding to $SF_n$ on gNB-1) and $t(SF_{n+x})$ (corresponding to $SF_{n+x}$ on gNB-1). In step 435, the UE 110 sends an RRC message (in this example) to gNB-2, informing the gNB-2 170-1 of the unavailability of the UE for time intervals $t(SF_n)$ and $t(SF_{n+x})$. Note that there can be multiple non-contiguous time intervals within the indicated period of time (e.g., $SFN_n$ to $SFN_{n+x}$ and $SFN_m$ to $SFN_{m+y}$).

In response, in step 440, the gNB-2 170-1 will avoid scheduling (e.g., by signing off) the UE during the informed time interval(s). This is illustrated by the time intervals 450 and 460, where the UE is not scheduled (that is, no data is transmitted by the gNB-2 toward the UE and the UE does not have an UL grant for these periods). The time intervals 450 and 460 correspond to the $t(SF_n)$ and $t(SF_{n+x})$, respectively. Note that what is communicated to the gNB2 is, in this exemplary embodiment, t(SFn) and t(SFn+x), where t(x) is a time conversion function that translates corresponding SFs to actual time, e.g., at the gNB-2 170-1. The gNB-2 170-1 can still ignore the UE's unavailability in case, e.g., the gNB-2 has a high priority activity which requires the UE's response (e.g., an emergency MT call).

The UE in step 470 performs the scheduled UL transmission to gNB-1 170 in $SF_n$, and performs in step 480 the scheduled UL transmission to gNB-1 170 in $SF_{n+x}$.

The message in step 435 may be informed to the NW using, e.g., an RRC message, which is fast enough for this type of information. The RRC message may be in an uplink—dedicated control channel (UL-DCCH) Message class, i.e., in the set of RRC messages that may be sent from the UE to the network on UL-DCCH logical channel. Then two exemplary embodiments could be applied, as described below.

In a first exemplary embodiment, the existing UL-DCCH message, UEAssistanceInformation is modified. This message is currently used by a UE in the RRC_connected state for indication of UE assistance information to the network if the UE was configured by the NW to do so. This message is specified for the UE to provide a delay budget report and upon change of delay budget preference, upon detecting internal overheating, or upon detecting that the UE is no longer experiencing an overheating condition. Exemplary embodiments herein propose this message to be extended by adding the possibility for the UE to inform its unavailability time. See the exemplary method in FIG. 5.

FIG. 5 illustrates an exemplary proposal to extend a UEAssistanceInformation message by adding the possibility for the UE to inform its unavailability time. As indicated in FIG. 5, upon initiating the procedure (e.g., to inform the network of unavailability time), the UE 110 will perform the following:

1> if configured to provide UE availability report:
2> if the UE did not transmit a UEAssistanceInformation message with availabilityReport since it (the UE) was configured to provide a UE availability report; or
2> if the current availability report is different from the one indicated in the last transmission of the UEAssistanceInformation message;
3> initiate transmission of the UEAssistanceInformation message in with its availability report.

In a second exemplary embodiment, alternatively, a new RRC message could be introduced as a new UL-DCCH-Message class using one of three remaining spare messages. The NW could then configure the UE to transmit the availability information autonomously or as response to a NW triggered request.

In a variant of this signaling type, the UE report of the availability may be provided as a bit map, where each position in the bit map indicates the UE's intention of monitoring for DL traffic from the serving network. The bit in an exemplary embodiment represents periods of time, which can be from slots, to subframes to groups of frames, and the like. As the bit map is expected to be repeating over time, the UE will thereby be able to indicate specific periodic instances where the UE will not be available. Such signaling could be useful for indicating unavailability due to need(s) for monitoring for paging messages from other network(s). Additionally, when this periodicity bitmap is no longer valid (e.g., one of the SIMs at the UE goes to idle), then the UE can inform the network by transmitting a new periodicity bitmap.

In another variant of this signaling type, the UE indicates a set of time instances where the UE is not available for scheduling through a local time reference and a duration. An example of such indication would be that UE is not available for scheduling starting at system frame number (SFN) 'x', slot 'y' and for a duration of 'z' slots.

Figure 6:
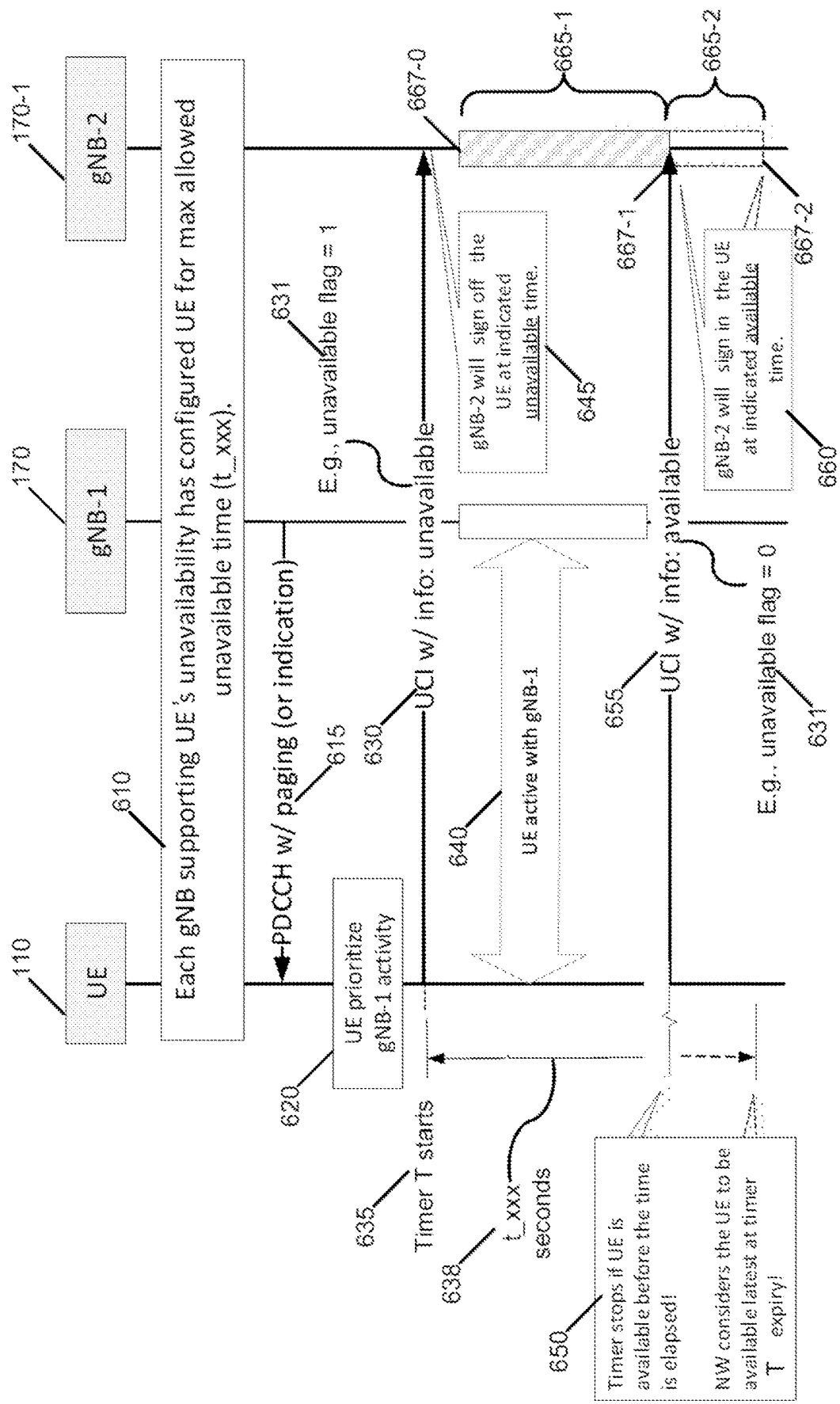
FIG. 6 is a signaling diagram and message sequence chart showing an example of UCI message from a UE to gNB with an "unavailable flag", in accordance with an exemplary embodiment.

Moving to a description of Type 2, which is for dynamically scheduled activities, in this case, the UE needs a fast indication of unavailability (or extension of upcoming unavailability) to the NW (e.g., if UE has received indication about upcoming paging) and an RRC message would be too slow. As is known, The Uplink Control Information (UCI) is a physical layer payload, and as such is decoded faster than the L3 payloads, which in some cases might require some communication between the gNB and the core network for their correct processing. In this case, the UE signaling would be dynamic in nature, and one exemplary way to provide this information would be through an uplink control information (UCI)-based message. A signaling sequence is shown as an example for this case in FIG. 6 and the steps described below. FIG. 6 is a signaling diagram and message sequence chart showing an example of UCI message from a UE to a gNB with an "unavailable flag", in accordance with an exemplary embodiment.

FIG. 6 illustrates the signaling between the UE 110, e.g., under control of the control module 140, and the gNB-1 170 and gNB-2 170-1, e.g., under control of a corresponding control module 150.

In step 610, each gNB supporting the UE's unavailability has configured the UE for a maximum (max) allowed unavailable time of with a value of t_xxx. In step 615, the UE 110 receives paging from gNB-1 170 (or an indication of the paging). In step 620, the UE 140 prioritizes gNB-1 activity. In response, in step 630, the UE 110 will raise an "unavailable flag" 631 at gNB-2 in order not to be disturbed as the UE would not be able to respond. This example uses a UCI message with information (the unavailable flag 631 with a value of "unavailable", which is one in this case) indicating the UE is unavailable, although other signaling may be used and something other than a "flag" may be used.

In step 645, the gNB-2 170-1 will consider the UE as unavailable at the informed time and will suspend (e.g., postpone) its activities with the UE. The terminology of signing off the UE at the indicated time includes this suspension/postponement. The gNB-2 can still ignore the UE's unavailability in case the gNB-2 has a high priority activity (e.g., this activity needs a response within a certain time) which requires the UE's response (e.g., an emergency MT call).

In this example, the UE 110 is active with (e.g., transmitting to and/or receiving from) the gNB-1 170 in step 640. In step 655, the UE may remove the "unavailable flag" at the gNB-2 170-1 when the UE's activity with gNB-1 is completed. This availability can be informed to the NW by a UCI message, indicating the UE is now available (e.g., the unavailable flag 631 has a value of "available", or zero in this example), transmitted over the physical uplink control channel (PUCCH) or the physical uplink shared channel (PUSCH). In response, the gNB-2 170-1 in block 660 the gNB-2 will resume, or have the capability to resume, any activities with the UE 110. That is, the gNB-2 can resume activities in response to the reception of the messaging in step 655. The time period 665 (655-1+655-2) is the original time period, as defined by the maximum unavailability time, having a value of t_xxx, from 667-0 to 667-2 for the suspension of activities. In this example, however, this time period 665 is broken into time period 655-1 (from time 667-0 to time 667-1) with suspension of activities and 665-2 (from time 667-1 to 667-2) with (possible) resumption of activities.

Alternatively, an unavailable timer may be configured by the NW. The UE has to explicitly reset this timer if the UE is still unavailable when the timer value is elapsed. In the example of FIG. 6, a timer T is started in reference 635 with a timer value 638 of t_xxx, and should end t_xxx seconds later. In block 650, the timer stops (by the UE) if the UE is available before the time is elapsed. If the NW does not receive a message with UE's availability before the timer expires, the NW considers the UE to be available at the latest at timer T's expiry.

The UCI message of the unavailability could in one embodiment be carried on a PUCCH under a framework that corresponds to the scheduling request (SR). Under the SR framework, the UE is configured with a physical resource for UL transmission. This physical resource will allow the UE to indicate to the network that the UE has data in its buffer and hence needs a scheduling grant for UL transmission. According to an exemplary embodiment, a similar physical channel could allow the UE to indicate that the UE will not be available for DL traffic for a specific or pre-configured amount of time.

To indicate a specific amount of time, the UE could use an UL channel capable of carrying multiple bits for the non-availability information, and in this case, the UL signaling for this could be an indication of start and duration of the unavailability time (e.g., in a predefined granularity or predefined durations).

Time drift between USIM considerations are now considered. Common for both types, a certain level of time accuracy is needed to make sure a time drift across the two USIM's corresponding NWs will not invalidate a reported "unavailable time" before the end of the time is reached. To achieve this accuracy, certain exemplary embodiments propose the following.

The UE could update a time conversion (e.g., using function t(x) above) periodically and transmit a new report if the time drift is more than a specified value. The time drift is in an exemplary embodiment the difference in timing between the two USIMs and potentially even the two networks. The periodicity and/or max (maximum) tolerable time drift can be preconfigured by the NW depending on, e.g., subcarrier spacing.

The UE could add a headroom to the reported "unavailable time", such that a calculated time drift will not exceed the specified value before a report is updated.

Although the exemplary embodiments above have been described using subscriber identity module, it is also possible to use other information. For instance, user identities may be used, e.g., using known techniques. These identities may also be determined using at least corresponding subscriber identity modules. That is, the user identity can comprise a subscriber identity or other user identities.

Without in any way limiting the scope, interpretation, or application of the claims appearing below, technical effect and advantages of one or more of the example embodiments disclosed herein include the following:

1) The UE would not be interrupted by activities from a gNB when the UE is occupied in communication with another gNB. Note that the "another gNB" may be the same physical node. However, the UE has independent communication for each of its subscriptions (USIMs) without any awareness about whether the two NBs are the same.
2) MUSIM devices have the capability to break or bypass existing network services by silent deprioritizing some services without informing the network. When the NW is aware of a UE being unavailable due to other USIM, the network has possibility to optimize the degraded performance at UE and also save network resources and traffic load which would not have been used by the UE anyway.

As used in this application, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:
  3GPP third generation partnership project
  5G fifth generation
  5GC 5G core network
  AMF access and mobility management function
  CS circuit switched
  CU central unit
  CW continuous waveform
  DC dual connectivity
  DCCH dedicated control channel
  DSDA dual SIM dual standby
  DSDS dual SIM dual active
  DU distributed unit
  eMBB enhanced Mobile Broad Band
  eNB (or eNodeB) evolved Node B (e.g., an LTE base station)
  EN-DC E-UTRA-NR dual connectivity
  en-gNB or En-gNB node providing NR user plane and control plane protocol terminations towards the UE, and acting as secondary node in EN-DC
  EPC evolved packet core
  E-UTRA evolved universal terrestrial radio access, i.e., the LTE radio access technology
  gNB (or gNodeB) base station for 5G/NR, i.e., a node providing NR user plane and control plane protocol terminations towards the UE, and connected via the NG interface to the 5GC
  HB high band
  HW hardware
  ID identification I/F interface
IMSI international mobile subscriber identity
LB low band
LTE long term evolution
MAC medium access control
max maximum
MB mid-band
MIMO multiple input multiple output
MME mobility management entity
mmW millimeter wave
MNO mobile network operator
MNVO mobile network virtual network
MT mobile terminated
MUMA multi USIM multi active
MUMS multi USIM multi standby
MUSIM multi universal subscriber identity module
ng or NG next generation
ng-eNB or NG-eNB next generation eNB
NR new radio
N/W or NW network
PDCP packet data convergence protocol
PHY physical layer
PLMN public land mobile network
PUCCH primary physical uplink control channel
PUSCH primary physical uplink shared channel
RAN radio access network
Rel release
RLC radio link control
RNTI Radio Network Temporary Identifier
RRH remote radio head
RRC radio resource control
RSSI received signal strength indicator
RU radio unit
Rx or RX receiver or reception
SA service and system aspects
SDAP service data adaptation protocol
SF subframe
SGW serving gateway
SIB system information block
SIM subscriber identity module
SMF session management function
SR scheduling request
TR technical report
TS technical specification
Tx or TX transmitter or transmission
UCI uplink control information
UE user equipment (e.g., a wireless, typically mobile device)
UHB ultra high band
UL uplink (from user equipment toward the network)
UL-DCCH uplink—dedicated control channel
UPF user plane function
USIM universal subscriber identity module
VoIP voice over internet protocol
VoLTE voice over long term evolution
VoNR voice over next radio

The invention claimed is:

1. A method, comprising:
at a user equipment having at least two connections to at least two network nodes, where each connection corresponds to a different user identity, wherein each user identity is determined using at least a subscriber identity module;
receiving by the user equipment and from one or both of the network nodes a maximum allowed unavailable time;
selecting by the user equipment one of the at least two network nodes to communicate exclusively with during one or more time intervals; and
sending by the user equipment one or more messages toward the other ones of the at least two network nodes, the one or more messages indicating to the other ones of the at least two network nodes that the user equipment is unavailable for communication during the one or more time intervals,
wherein the one or more time intervals for another one of the least two network nodes are indicated using a function that converts from one time frame from one network node to another time of another network node to address time drift in communications by the user equipment with the one network node and the other network node.

2. An apparatus, comprising:
at least one processor; and
at least one memory storing instructions that, when executed with the at least one processor, cause the apparatus to perform:
at a user equipment having at least two connections to at least two network nodes, where each connection corresponds to a different user identity, wherein each user identity is determined using at least a subscriber identity module;
receiving by the user equipment and from one or both of the network nodes a maximum allowed unavailable time;
selecting by the user equipment one of the at least two network nodes to communicate exclusively with during one or more time intervals; and
sending by the user equipment one or more messages toward the other ones of the at least two network nodes, the one or more messages indicating to the other ones of the at least two network nodes that the user equipment is unavailable for communication during the one or more time intervals,
wherein the one or more time intervals for another one of the least two network nodes are indicated using a function that converts from one time frame from one network node to another time of another network node to address time drift in communications by the user equipment with the one network node and the other network node.

3. The apparatus as claimed in claim 2 wherein the at least one memory and instructions, when executed with the at least one processor, cause the apparatus to perform communicating by the user equipment with the selected network node during the one or more time intervals.

4. The apparatus as claimed in claim 2 wherein the at least one memory and instructions, when executed with the at least one processor, cause the apparatus to perform the selecting of the one of the at least two network nodes in response to the user equipment determining uplink data needs to be transmitted that corresponds to a user identity, and selecting the network node corresponding to the user identity.

5. The apparatus as claimed in claim 2 wherein the at least one memory and instructions, when executed with the at least one processor, cause the apparatus to perform receiving by the user equipment an uplink grant indicating a period of time to use for uplink transmission of the uplink data, and setting the one or more time intervals to be the period of time.

6. The apparatus as claimed in claim 2 wherein the period of time comprises one or more subframes, one or more frames, a group of frames, one or more slots, one or more symbols, or a specific time interval given in seconds.

7. The apparatus as claimed in claim 2 wherein there are multiple non-contiguous time intervals within the indicated period of time.

8. The apparatus as claimed in claim 2 wherein the at least one memory and instructions, when executed with the at least one processor, cause the apparatus to perform the sending by the user equipment one or more messages further comprising sending the one or more messages using radio resource control signaling indicating the period of time.

9. The apparatus as claimed in claim 8 wherein the one or more messages comprise user equipment availability reports.

10. The apparatus as claimed in claim 2 wherein the at least one memory and instructions, when executed with the at least one processor, cause the apparatus to perform:
in response to the user equipment being configured to provide a user equipment availability report, the user equipment performing the following: transmitting by the user equipment a current availability report in response to the user equipment not transmitting an availability report since the user equipment was configured to provide the user equipment availability report; or transmitting by the user equipment the current availability report in response to the current availability report being different from one indicated in a last transmission of an availability report.

11. The apparatus as claimed in claim 2 wherein the at least one memory and instructions, when executed with the at least one processor, cause the apparatus to perform the selecting of the one of the at least two network nodes in response to the user equipment receiving a paging or indication of the paging from the selected network node, and selecting the network node corresponding to the received paging or indication of the paging.

12. The apparatus as claimed in claim 11 wherein the maximum allowed unavailable time is divided into a time period for suspension of activities and a time period for resumption of activities.

13. The apparatus as claimed in claim 11 wherein the one or more messages indicate to the other network node that the user equipment is unavailable but do not indicate corresponding one or more time intervals, as the other network node is to associate the maximum allowed unavailable time as a time period during which the user equipment is unavailable for communication with the other network node.

14. The apparatus as claimed in claim 11 wherein the at least one memory and instructions, when executed with the at least one processor, cause the apparatus to perform sending, by the user equipment and prior to expiration of the maximum allowed unavailable time, one or more messages toward the other network node indicating the user equipment is now available for communication.

15. The apparatus as claimed in claim 13 wherein the one or more messages indicating the user equipment is now available for communication comprise an uplink control information message, transmitted over one of a physical uplink control channel or a physical uplink shared channel.

16. The apparatus as claimed in claim 2 wherein the at least one memory and instructions, when executed with the at least one processor, cause the apparatus to perform,
in response to sending the one or more messages toward the other ones of the at least two network nodes, setting by the user equipment a time to respond with an availability message, and in response to expiration of the time:
in response to the user equipment being finished with the exclusive communication, the user equipment performs no actions with respect to sending additional messages indicating availability; and
in response to the user equipment not being finished with the exclusive communication, sending by the user equipment additional one or more messages toward the other ones of the at least two network nodes, the additional one or more messages indicating to the other ones of the at least two network nodes that the user equipment is unavailable for communication during additional one or more time intervals.

17. The apparatus as claimed in claim 2 wherein the at least one memory and instructions, when executed with the at least one processor, cause the apparatus to perform updating by the user equipment the function periodically and transmitting further one or more messages toward the other network node in response to the time drift being more than a specified value.

18. An apparatus, comprising:
at least one processor; and
at least one memory comprising instructions that, when executed with the at least one processor, cause the apparatus to perform operations comprising:
at a network node having a connection to a user equipment based on a user identity, wherein the user equipment has at least two connections to at least two network nodes, where each connection corresponds to a different user identity, wherein each user identity is determined using at least a subscriber identity module;
transmitting by the network node to the user equipment a maximum allowed unavailable time;
receiving by the network node one or more messages from the user equipment indicating that the user equipment is unavailable for communication during one or more time intervals; and
not communicating by the network node with the user equipment during the indicated one or more time intervals,
wherein the one or more time intervals for another one of the least two network nodes are indicated using a function that converts from one time frame from one network node to another time of another network node to address time drift in communications by the user equipment with the one network node and the other network node.

* * * * *